United States Patent
Lennevi et al.

(10) Patent No.: US 9,697,652 B2
(45) Date of Patent: Jul. 4, 2017

(54) METHOD FOR MONITORING STATE OF HEALTH OF A VEHICLE SYSTEM

(71) Applicant: VOLVO TRUCK CORPORATION, Göteborg (SE)

(72) Inventors: Jerker Lennevi, Lerum (SE); Bengt Larsson, Göteborg (SE); Tobias Smidebrant, Göteborg (SE)

(73) Assignee: Volvo Truck Corporation, Göteborg (SE)

(*) Notice: Subject to any disclaimer, the term of this patent is extended or adjusted under 35 U.S.C. 154(b) by 0 days.

(21) Appl. No.: 14/785,341

(22) PCT Filed: Apr. 22, 2013

(86) PCT No.: PCT/EP2013/001189
§ 371 (c)(1),
(2) Date: Oct. 18, 2015

(87) PCT Pub. No.: WO2014/173421
PCT Pub. Date: Oct. 30, 2014

(65) Prior Publication Data
US 2016/0078690 A1    Mar. 17, 2016

(51) Int. Cl.
*G07C 5/00* (2006.01)
*G07C 5/08* (2006.01)
(Continued)

(52) U.S. Cl.
CPC ............ *G07C 5/006* (2013.01); *B60L 3/0023* (2013.01); *B60L 3/0046* (2013.01); *B60L 3/0061* (2013.01);
(Continued)

(58) Field of Classification Search
None
See application file for complete search history.

(56) References Cited

U.S. PATENT DOCUMENTS 4,525,782 A * 6/1985 Wohlfarth ........... B60R 16/0234
340/457.4
5,491,631 A * 2/1996 Shirane ................... F02D 41/22
123/479
(Continued)

FOREIGN PATENT DOCUMENTS

EP   1219946 A2   7/2002
JP   57144441     9/1982
(Continued)

OTHER PUBLICATIONS

International Search Report (Jan. 14, 2014) for corresponding International App. PCT/EP2013/001189.
(Continued)

*Primary Examiner* — Fadey Jabr
*Assistant Examiner* — Kevin P Mahne
(74) *Attorney, Agent, or Firm* — WRB-IP LLP

(57) ABSTRACT

A method is provided for monitoring a state of health of a vehicle system and includes measuring a plurality of parameter values for the system at different running conditions as an end of line test, storing the parameter values in a fingerprint file, measuring the same plurality of parameter values that is comprised in the fingerprint file after a predefined time interval, adding a predefined ageing offset to the fingerprint file, where the ageing offset corresponds to a predicted wear of the system during the predefined time interval, thereby obtaining a time modified fingerprint file for the system, comparing the measured values with the time modified fingerprint file, and issuing a message if the measured values deviates from the time modified fingerprint file. The state of health can be compared with initial measurements such that the state of health of a vehicle system or component can be monitored over a longer time period.

19 Claims, 2 Drawing Sheets

(51) Int. Cl.
*B60L 3/00* (2006.01)
*B60L 3/12* (2006.01)
*B60L 7/14* (2006.01)
*B60L 7/26* (2006.01)
*B60L 11/14* (2006.01)
*B60L 11/18* (2006.01)

(52) U.S. Cl.
CPC ........ *B60L 3/12* (2013.01); *B60L 7/14* (2013.01); *B60L 7/26* (2013.01); *B60L 11/14* (2013.01); *B60L 11/1816* (2013.01); *B60L 11/1857* (2013.01); *B60L 11/1861* (2013.01); *G07C 5/0841* (2013.01); *B60L 2200/18* (2013.01); *B60L 2200/36* (2013.01); *B60L 2200/40* (2013.01); *B60L 2240/12* (2013.01); *B60L 2240/36* (2013.01); *B60L 2240/421* (2013.01); *B60L 2240/423* (2013.01); *B60L 2240/425* (2013.01); *B60L 2240/441* (2013.01); *B60L 2240/443* (2013.01); *B60L 2240/445* (2013.01); *B60L 2240/545* (2013.01); *B60L 2240/622* (2013.01); *B60L 2240/662* (2013.01); *B60L 2240/667* (2013.01); *B60L 2240/80* (2013.01); *B60L 2260/50* (2013.01); *B60L 2270/12* (2013.01); *B60L 2270/145* (2013.01); *Y02T 10/642* (2013.01); *Y02T 10/70* (2013.01); *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 10/7291* (2013.01); *Y02T 90/14* (2013.01); *Y02T 90/16* (2013.01); *Y02T 90/162* (2013.01)

(56) References Cited

U.S. PATENT DOCUMENTS

| | | | | | |
|---|---|---|---|---|---|
| 6,026,639 | A * | 2/2000 | Kumar | ............... | F01N 11/007 60/274 |
| 6,546,363 | B1 * | 4/2003 | Hagenbuch | ............ | G07C 5/085 177/25.14 |
| 7,369,925 | B2 * | 5/2008 | Morioka | ............... | G07C 5/008 340/438 |
| 7,512,477 | B2 * | 3/2009 | Quigley | ............ | F02D 41/1406 701/103 |
| 9,476,803 | B2 * | 10/2016 | Al-Najjar | ............ | G05B 23/024 |
| 2002/0087238 | A1 * | 7/2002 | Matsui | ............... | G01M 17/007 701/31.4 |
| 2002/0103623 | A1 * | 8/2002 | Hasegawa | ............ | G07C 5/008 702/184 |
| 2002/0161495 | A1 * | 10/2002 | Yamaki | ............... | G01M 15/05 701/33.8 |
| 2003/0216889 | A1 * | 11/2003 | Marko | ............... | G07C 5/0808 702/182 |
| 2005/0114088 | A1 * | 5/2005 | Gorden | ............... | F02D 41/22 702/185 |
| 2006/0058932 | A1 * | 3/2006 | Garg | ............ | B60K 6/32 701/32.8 |
| 2007/0079651 | A1 * | 4/2007 | Denkmayr | ............ | G01M 15/05 73/114.77 |
| 2007/0260391 | A1 * | 11/2007 | Gaulmin | ............... | F02C 9/28 701/100 |
| 2007/0299575 | A1 * | 12/2007 | Yamada | ............... | G06Q 10/20 701/31.4 |
| 2008/0004840 | A1 * | 1/2008 | Pattipatti | ............ | G05B 23/0243 702/183 |
| 2009/0001996 | A1 * | 1/2009 | Rahman | ............... | G01M 15/042 324/623 |
| 2009/0118897 | A1 * | 5/2009 | Schoeggl | ............ | G07C 5/0808 701/31.4 |
| 2010/0057479 | A1 * | 3/2010 | De | ............... | G06Q 10/20 705/305 |
| 2010/0217535 | A1 * | 8/2010 | Seidel | ............... | G06Q 50/06 702/24 |
| 2010/0262331 | A1 * | 10/2010 | Maesse | ............... | F01N 3/2066 701/29.5 |
| 2011/0046842 | A1 * | 2/2011 | Smith | ............... | G07C 5/006 701/31.4 |
| 2011/0082621 | A1 * | 4/2011 | Berkobin | ............ | B60L 11/1824 701/31.4 |
| 2012/0116638 | A1 * | 5/2012 | Leising | ............... | F16D 27/115 701/67 |
| 2012/0150381 | A1 * | 6/2012 | Nath | ............... | G07C 5/085 701/29.4 |
| 2013/0073222 | A1 * | 3/2013 | Shin | ............... | G06F 19/00 702/34 |
| 2013/0085696 | A1 * | 4/2013 | Xu | ............... | B60L 3/12 702/63 |
| 2013/0090900 | A1 * | 4/2013 | Gering | ............ | G01R 31/3679 703/2 |
| 2013/0158755 | A1 * | 6/2013 | Tang | ............... | H01M 10/48 701/22 |
| 2013/0294479 | A1 * | 11/2013 | Ichikawa | ............ | H01M 10/425 374/109 |
| 2014/0309905 | A1 * | 10/2014 | Drew | ............... | F02D 29/02 701/101 |
| 2014/0379199 | A1 * | 12/2014 | Schulz | ............... | B60W 40/12 701/29.2 |
| 2015/0066406 | A1 * | 3/2015 | Sun | ............... | G01R 31/3679 702/63 |
| 2015/0144077 | A1 * | 5/2015 | Rimkus | ............... | F02D 41/22 123/2 |
| 2015/0354402 | A1 * | 12/2015 | Ehsani | ............... | F03D 17/00 290/44 |
| 2016/0011274 | A1 * | 1/2016 | Morita | ............... | H02J 7/0021 702/63 |
| 2016/0027223 | A1 * | 1/2016 | Madison | ............... | G07C 5/0808 701/29.6 |
| 2016/0078690 | A1 * | 3/2016 | Lennevi | ............... | G07C 5/006 701/33.6 |
| 2016/0102626 | A1 * | 4/2016 | Johansson | ............ | G01M 15/05 701/114 |

FOREIGN PATENT DOCUMENTS

| | | |
|---|---|---|
| JP | 04194645 | 7/1992 |
| JP | 2002203065 | 7/2002 |
| JP | 2013246011 | 5/2012 |
| WO | 2008127243 A1 | 10/2008 |

OTHER PUBLICATIONS

International Preliminary Report on Patentability (Mar. 27, 2015) for corresponding International App. PCT/EP2013/001189.

Japanese Official Action (translation) (Dec. 20, 2016) from corresponding Japanese App. 2016-509300.

* cited by examiner

METHOD FOR MONITORING STATE OF HEALTH OF A VEHICLE SYSTEM

BACKGROUND AND SUMMARY

The present invention relates to a method for monitoring state of health of a vehicle system over the life time of the vehicle, and further to a computer program and a computer program product for performing such a method.

Vehicles and vehicle components are tested during manufacture of the vehicle. Most components can be tested and verified at the sub-supplier when the component is manufactured. However, many components are comprised in a system in which several different components make up the system. Such a system can only be tested and verified when completely assembled. Some system can only be tested and verified when mounted on the vehicle, since they require input from other systems.

Even if each component that is comprised in a system is verified and complies with the required tolerances, the system itself may still be out of tolerance due to added tolerances from the different components. Thus, with normal deviation, some systems may be out of tolerance. In a vehicle, with several different sub-systems, it is likely that some vehicles will perform somewhat differently than other vehicles, where the added tolerances will compensate each other. Some vehicles may even perform much better than the average vehicle when the tolerances are added in an optimal way.

Normally, each component or system has to comply with a given tolerance. Such tolerances are decided upon such that most components and systems will function properly, but are fixed values that can be compared with measured values for the component or system. A component that falls outside a fixed tolerance value is discarded, even if the component could function properly with other components adapted for that measure. Also complete systems of a vehicle will have to be within certain fixed tolerances.

If a component or system is close to a tolerance limit, it will be within tolerance. When the component or system has been used for a while, it may fall outside the tolerance limit due to wear, even if the component or system is not worn very much. In an inspection, the component or system may thus be seen as defective.

Some components and systems have greater deviations than other. It is e.g. fairly easy and cost-effective to manufacture valves within tight tolerances, but more difficult or impossible to manufacture an electrical component within a specified tolerance. The only way to arrive at a required tolerance may then be to manufacture several components and to thereafter measure all components and to group them in different component classes having different tolerances. This is a costly and time-consuming operation. Further, this grouping may only be valid when the component is new, since different components may age differently. Even if a new component was within tolerance, it may be seen as out of tolerance when measured after use.

Some components or systems may also be mounted on the vehicle and may thereafter be adjusted to a specific tolerance. This applies to certain electrical components and systems, where a calibration is done after mounting.

Some components and systems will have a predicted ageing behaviour, which can be used to determine when a service or replacement is to be performed on that component or system. One disadvantage of using a predicted ageing for a component or a system is that some components or systems may be unnecessarily serviced or replaced. Other components or systems may not be serviced or replaced in time, due to a higher wear than predicted.

It is thus room for an improved method for monitoring state of health of a vehicle system over the life time of the vehicle.

It is desirable to provide an improved method for monitoring state of health of a vehicle system.

In a method for monitoring state of health of a vehicle system, the steps of measuring a plurality of parameter values for the system at different running conditions as an end of line test, storing the parameter values in a fingerprint file, measuring the same plurality of parameter values that is comprised in the fingerprint file after a predefined time interval, adding a predefined ageing offset to the fingerprint file, where the ageing offset corresponds to a predicted wear of the system during the predefined time interval, thereby obtaining a time modified fingerprint file for the system, comparing the measured values with the time modified fingerprint file, and issuing a message if the measured values deviates from the time modified fingerprint file are comprised.

By this first embodiment of the method, the method can monitor the state of health of a vehicle system, and determine if the state of health is within predefined limits or not. This is done by first measuring a plurality of parameter values for the specific system when the system of the vehicle is new, e.g. as an end of line test at the manufacturing plant. The parameters are measured at different running conditions, e.g. at different load conditions such as at low load, medium load and top load. The parameter values for the different load conditions are stored in a fingerprint file that is saved in a memory in the vehicle control system. This original fingerprint file will thus contain the actual performance of the system when it was delivered. The same parameters are measured at similar load conditions at a later moment, and are stored in an additional fingerprint file. Similar load conditions may either be simulated in e.g. a work shop when the vehicle stands still, or may be found when the vehicle travels on a road. The acceleration of a fully loaded vehicle will e.g. correspond to a full load condition, and a slow marshalling will e.g. correspond to a low load condition. Since the different measurements are stored in an additional fingerprint file, where the measurements are confined by an acceptance area, it is not important that the different load conditions are exactly the same. It is still important that measurements are measured at different load conditions.

Further, an ageing offset is added to the original, fingerprint file and stored in a modified fingerprint file. The ageing offset comprises a predefined ageing behaviour of the system, and is dependent on time or travelled distance of the vehicle. The measured values contained in the additional fingerprint file are compared with the modified fingerprint file. If the measured values, i.e. the additional fingerprint file, deviate from the modified fingerprint file, a message is issued. The message may be given to the operator of the vehicle or may be saved in an error log of the vehicle, where a work shop can investigate the cause at a later stage, or at a regular service appointment.

In a development of the method, the moment when the additional fingerprint file is measured corresponds to a regular service interval. In this way, the measurements of the plurality of parameters may be performed at the work shop, in a controlled environment. In a work shop, it is easier to perform the different measurements at the same conditions as for the end-of-line test, since the same conditions can easily be simulated at stand still. For some measurements, it may be advantageous to use an artificial, simulated load instead of a real load. One such load may be art engine load, where it may be easier to simulate a top load condition in a work shop than to find such a condition on the road.

An additional fingerprint file is measured at different time intervals. The time intervals may either be predefined time intervals, where a time interval may be a month or more, or may be based on travelled distance of the vehicle. It is of course also possible to measure additional fingerprint files at other moments, such as at shorter time intervals, but since the ageing of the systems are normally relatively slow, such that it may take several years until a critical degradation has occurred, a month or more suffice. It is also possible to initiate an additional fingerprint measurement from a service centre, in order to obtain an additional fingerprint file for a specific system or component.

The additional fingerprint files may also be saved in a memory, such that a statistical follow up can be made. The additional fingerprint files may be stored in the vehicle control system or may be transferred to a central data base at the manufacturer. An advantage of storing the additional fingerprint files at the manufacturer is that the manufacturer can use the collected additional fingerprint files from several different vehicles in order to perform follow up investigations on different components that have been found faulty or that have been redesigned.

The vehicle is preferably a hybrid vehicle comprising a combustion engine and an electric engine powered by a battery or other electrical power source. The vehicle system may be e.g. a diesel engine, an electric engine, an exhaust after treatment system, a cooling system or a battery. The ageing offset may be dependent on outer conditions of the vehicle, such as temperature, altitude, humidity, geographical position or the number of particles in the air. The ageing offset may also be dependent on the distance travelled by the vehicle.

In a development of the method, at least two additional fingerprint flies may he combined in a fingerprint matrix. In this development, several original fingerprint files are combined into an original fingerprint matrix comprising measurements from the end-of-line test. After a predefined time interval, several additional fingerprint files are measured and subsequently combined into an additional fingerprint matrix, which is compared with the original fingerprint matrix. A message is issued if the additional fingerprint matrix deviates from the original fingerprint matrix. An advantage of using a fingerprint matrix is that several systems can be compared at the same time, and that the relation between different systems can be compensated for directly in the matrix. In this way, the comparison can take account of different relationships in an easy way.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims.

Figure 1:
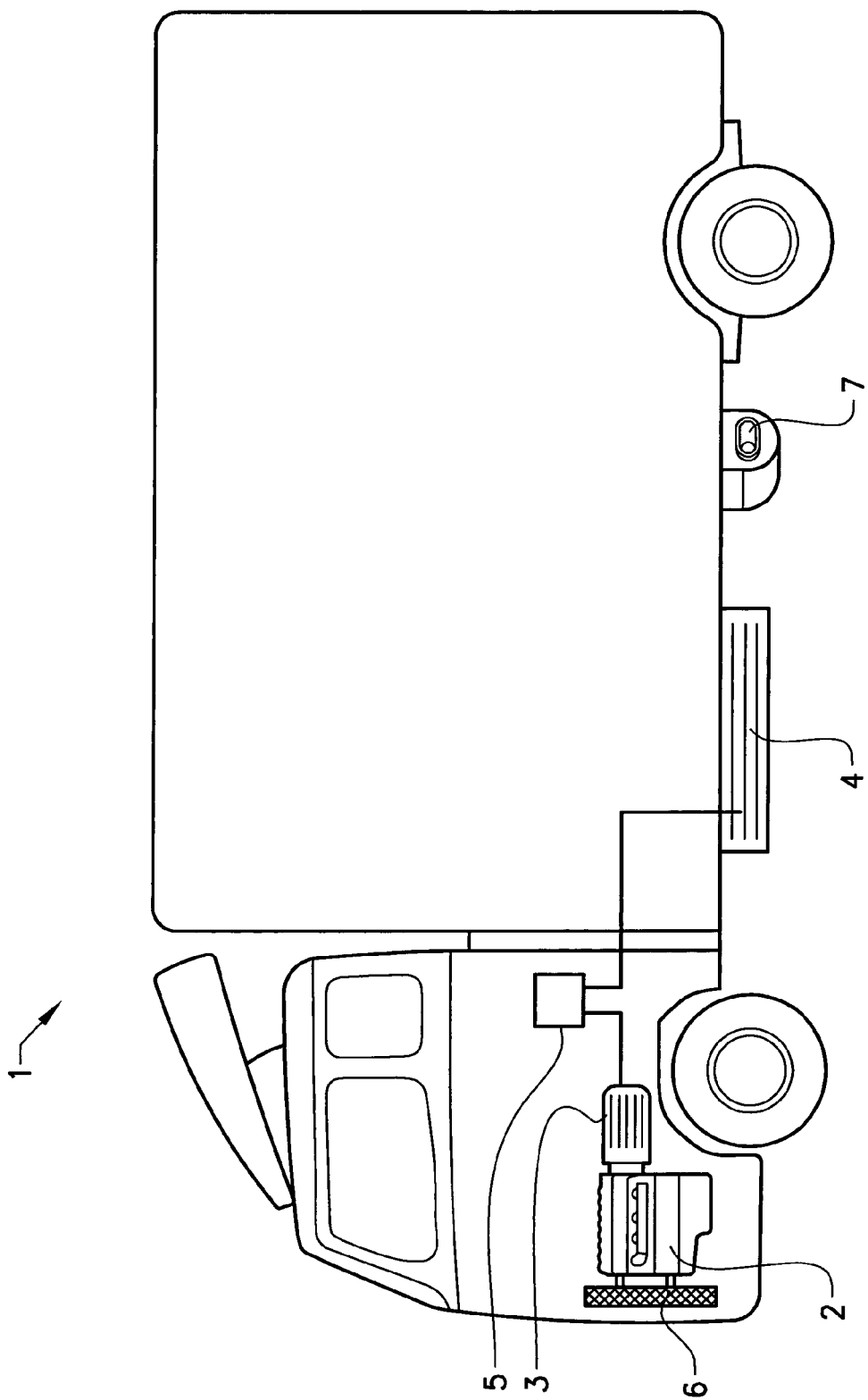
FIG. 1 shows a schematic hybrid vehicle comprising a vehicle system.

FIG. 1 shows a schematic hybrid vehicle 1, here shown as a delivery truck. The hybrid vehicle may be a regular hybrid vehicle or a plug-in hybrid vehicle. Other types of heavy hybrid vehicles such as busses, refuse vehicles, wheel loaders etc. can also be used with the inventive method. The hybrid vehicle is provided with a combustion engine 2, normally a diesel engine but other types of fuels, such as liquefied natural gas or compressed natural gas can of course also be used. The hybrid vehicle is also provided with an electric machine 3 connected to the engine 2. The electric machine is preferably positioned close to the engine but can also be placed apart from the engine, e.g. at the drive axle of the vehicle.

The electric machine can be used in a drive mode where it is used as an electric motor to power the vehicle. In the drive mode, it receives current from the battery 4. Depending on the type of hybrid vehicle, the electrical motor can either complement the combustion engine when extra power is needed, e.g. at starts, accelerations and upwards slopes, or it can power the complete vehicle when the combustion engine is shut off. The electric machine can also be used in a brake mode where it regenerates energy to the battery when the vehicle retards. During retardation, the electric machine is used as an electric brake and the energy can be used to recharge the battery. The electric machine can also be used as a regular generator that charges the battery when the vehicle is powered by the combustion engine travelling on a road, when the electric machine is not used in the drive mode or brake mode.

The vehicle is further provided with a control unit 5 which comprises a battery management function that controls the power flow to and from the battery depending on instructions received from the vehicle control system, such as requested acceleration, requested speed or requested brake power. The control unit is also provided with measurement functions that can collect measurements from other electronic control units (ECU) in the vehicle. The ECUs communicate over a local data bus and may control different functions of the vehicle, such that one or more dedicated ECUs control the combustion engine, one ECU controls the gearbox, one ECU controls the lights etc. Each ECU can send measurements through the data bus to the control unit 5. The control unit 5 may be a stand-alone unit or maybe integrated in another control unit.

The electric machine is preferably designed to complement the combustion engine. In this way, the combustion engine can run in an optimal speed range, with optimal energy consumption and a minimum of harmful exhaust gases. The electric machine may in this case be optimized such that it often delivers its full torque when running as an electric motor. If the combined torque from the combustion engine, running in the optimal speed range, and the electric motor is not sufficient, e.g. at a steep slope, the speed of the combustion engine can be raised. In this way, the size of the electric machine can be held relatively small and lightweight. For the same reason, the electric machine is designed to deliver its maximum current when used as an electric brake at an average retardation. If a faster or stronger retardation is required, an auxiliary brake, such as an engine brake or the service brakes, is used to complement the electric brake.

The electric machine can also be used to simulate a load for the combustion engine when the vehicle is standing still, e.g. at a work shop or at the end of line test, but it is also possible to perform a test when the vehicle is parked. This can be of advantage if the system has indicated a serious fault on e.g. the drive system. In this way, the load at the different running conditions can easily be simulated. When the vehicle is tested at the end of line or in a work shop, it is also possible to connect an external load to the drive line when the combustion engine or the drive line is to be tested.

At the end of line test, the combustion engine is running and is delivering power to the electric machine in the hybrid drive system of the vehicle, which charges the battery. Preferably, the sensors installed on the vehicle are used to measure the different parameter values, but it is also possible to use external sensors with a higher resolution if a higher precision is required. The result from the sensors are logged and saved and the data may be analysed. Preferably, a drive cycle is designed to test all systems of the vehicle. In one example, the combustion engine will first charge the battery at different speeds and at different power levels with the electric machine as a generator, where the torque of the combustion engine and the delivered current is measured. Thereafter, the battery may be discharged by running the electric machine as an electric motor that turns the combustion engine at different speeds and at different power levels, e.g. by engaging an engine brake or exhaust brake at different levels. The torque of the electric machine and the delivered current is measured. In this example, the battery state of health (SOH) can be tested by integration of the charge and discharge power.

The parameters for a system at different load conditions are stored in a fingerprint file. The measurement curves can be parameterized into a limited number of parameter values to limit the amount of stored data. The parameterization could be done with the help of a mathematical model of the vehicle. It is also possible to define an acceptance area for the measurement curves in order to reduce the data further. In this case, the acceptance area is comprised in the fingerprint file. If a component is replaced, a new fingerprint file for the system in which the component is comprised can be measured and stored as the original fingerprint file for that system.

The first, original fingerprint file for each vehicle system can be stored in the vehicle control system and/or in a database at the manufacturer. This original fingerprint file will function as the reference file for later measurements. When a new measurement for the same vehicle system is performed after a predefined time interval, the new measurements may be stored in an additional, intermediate fingerprint file. A predefined aging offset is added to the original fingerprint file and are stored as a time modified fingerprint file. The ageing offset corresponds to a predicted wear of the system for the predefined time interval and/or the travelled distance. The measured values, i.e. the additional fingerprint file, are compared to the time modified fingerprint file. If the measured values deviate from the time modified fingerprint file, a message is issued. The message may be a service notice to the operator or may be a flag stored in a memory indicating that a thorough check should be performed for that system at the next service.

The new measurements of the same parameters are measured at similar load conditions at a later moment, after a predefined time period, a predefined travelled distance or at any other specified moment. The load conditions may either be the same as for the original fingerprint file or they may be similar but not identical. The same load conditions may be simulated when the vehicle is standing still, e.g. in a work shop or when the vehicle is parked. Similar load conditions may be used when the vehicle travels on a road, such that different load conditions are identified and used for the measurements during use of the vehicle. The acceleration of a fully loaded vehicle will e.g. correspond to a full load condition, and a slow marshalling will e.g. correspond to a low load condition. Different driving conditions may be used for different load conditions. The measurements may be performed over a longer time period, e.g. during a day or a week, in order to find appropriate load conditions, it is of advantage to use both mediate load conditions and extreme load conditions to create the fingerprint file. Since the different measurements are stored in an additional fingerprint file, where the measurements are confined by an acceptance area, it is not important that the different load conditions are exactly the same or that they are measured at the same time. It is however important that measurements at different load conditions are measured.

Figure 2:
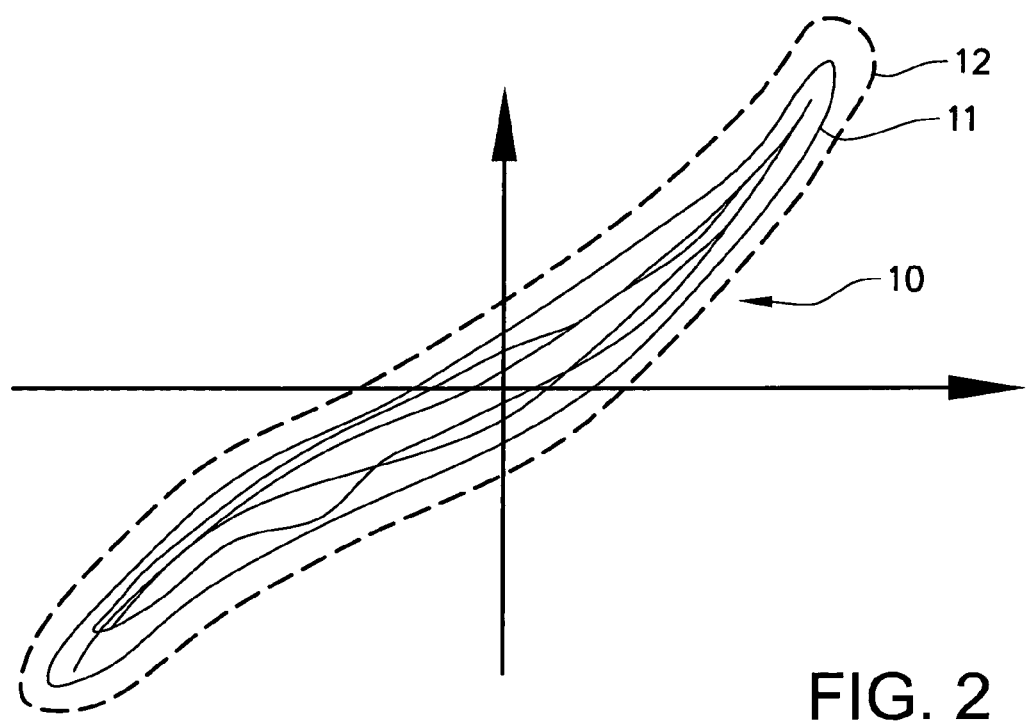
FIG. 2 shows an example of measurements in a fingerprint file.

In FIG. 2, a series of measurement values 10 measured at different load conditions stored in a fingerprint file are shown. In the shown example, the measurement values are confined in an acceptance area 11 of the fingerprint file, which reduces the storage space requirements. A time modified fingerprint file 12 is indicated with a dotted line. The x-axis may e.g. show current flow to and from the battery and the y-axis may e.g. show torque of the combustion engine or the electric machine, corresponding to the example described above.

The predefined time interval can be any time interval, but is preferably a relatively long-time interval such as a month or a few weeks, but could also be up to a year. It is possible to use different time intervals for different vehicle systems. Most systems age relatively slow, such as the combustion engine, while some systems such as the battery age faster. In one example, the time interval for the combustion engine is six months and the time interval for the battery is two weeks.

The time interval may also be dependent on the travelled distance by the vehicle, or on other parameters such as temperature. Some systems age over time, some systems age more due to travelled distance. For batteries, both the capacity and the ageing is dependent on ambient temperature.

The result of the comparisons between the measurement values and the respective time modified fingerprint files over the vehicle life time can be stored and used to create at state of health curve over the life time for the vehicle system. This can be used to suggest service intervals and exchange of components.

Different vehicle systems can be measured under different running conditions. It is possible to measure variations of the combustion engine, such as friction torque, engine efficiency, injection timing etc. Other measurements are temperature and temperature variations in the combustion engine, electric machine and battery during different load conditions, such as charging and discharging of the battery. The temperature or the temperature change and the exhaust gas composition in the exhaust gas after treatment system 7 can be measured e.g. during charging and discharging of the battery. This can give a measure of the ageing of the exhaust gas after treatment system and also of changes in the combustion engine.

Further measurements are turbo rotational speed, turbo pressure and turbo temperature in order to detect wear in the turbo system, it is also possible to measure vibrations in the chassis with, accelerometers in order to detect fatigue in the chassis.

These measurements can be made at different running conditions. For some measurements, it is advantageous to measure at the extreme load conditions, such as low load and high load. For a combustion engine, it is possible to measure the torque curve by measuring fuel consumption at several rotational speeds and several loads, but it may suffice to measure at low and high rotational speeds.

Other vehicle components and vehicle parameters can also be monitored by the inventive method, such as lamps, fans and valves. It is possible to measure the current through a component to see a change over time. Isolation values can be measured for various electrical systems in dependency of e.g. temperature, air humidity and pressure.

Figure 3:
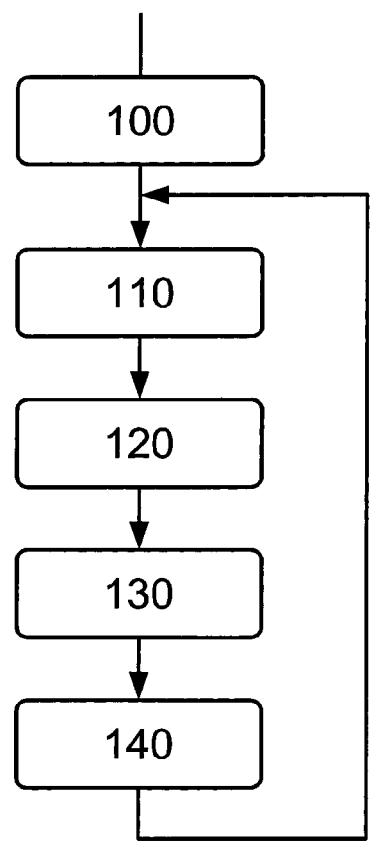
FIG. 3 shows a schematic flow chart of an inventive method for monitoring state of health of a hybrid vehicle.

FIG. 3 shows a schematic flow chart of the method for monitoring state of health of a vehicle system. The method is performed before over a longer time period in order to monitor long term degradations of different vehicle systems. The method steps are preferably performed by a computer program and a computer program product contained, and run in the electronic control system of the vehicle.

In step 100, a plurality of parameter values for the vehicle system are measured at different running conditions as an end of line test. The parameter values are stored in a fingerprint file, where the fingerprint file may comprise an acceptance area which encloses all measurement values. An example of such a fingerprint file is shown in FIG. 2.

In step 110, the same plurality of parameter values that are comprised in the fingerprint file are measured at similar load conditions after a predefined time interval and are stored in an additional fingerprint file. The time interval may be in the range from weeks to months.

In step 120, a predefined ageing offset is added to the fingerprint file, where the ageing offset corresponds to a predicted wear of the system during the predefined time interval. The result is stored in a time modified fingerprint file for the vehicle system.

In step 130, the measured values of the additional fingerprint file are compared with the time modified fingerprint file.

In step 140, a message is issued if the measured values deviates from the time modified fingerprint file. The message may be stored in a memory for later use or may be sent to a service centre for follow up.

The invention is not to be regarded as being limited to the embodiments described above, a number of additional variants and modifications being possible within the scope of the subsequent patent claims.

REFERENCE SIGNS

1: Vehicle
2: Combustion engine
3: Electric machine
4: Battery
5: Control unit
6: Cooling system
7: Exhaust gas after treatment system
10: Measurement values
11: Acceptance area
12: Modified fingerprint file

The invention claimed is:

1. Method for monitoring state of health of a vehicle system of a vehicle, comprising the following steps:
performing an end of line test on the vehicle system,
measuring a plurality of parameter values for the vehicle system at different running conditions during the end of line test,
storing the parameter values in a fingerprint file in a memory,
measuring the same plurality of parameter values that is comprised in the fingerprint file at similar running conditions after a predefined time interval and storing the plurality of parameter values measured after the predefined time interval in an additional fingerprint file in the memory,
adding a predefined ageing offset to the fingerprint file, where the ageing offset corresponds to a predicted wear of the system during the predefined time interval, thereby obtaining a time modified fingerprint file for the system, and storing the time modified fingerprint file in the memory,
comparing additional fingerprint file with the time modified fingerprint file using a control system, and
issuing a message if the additional fingerprint file deviate from the time modified fingerprint file.

2. Method according to claim 1, wherein the measured parameter values are stored in an additional fingerprint file together with information regarding the time of the measurement.

3. Method according to claim 1, wherein the predefined time interval is less than a year.

4. Method according to claim 1, wherein the predefined time interval less than a month.

5. Method according to claim 1, wherein the predefined time interval corresponds to a regular service interval.

6. Method according to claim 1, wherein the time interval is dependent on the travelled distance.

7. Method according to claim 1, wherein the vehicle is a hybrid vehicle comprising a combustion engine and an electric machine.

8. Method according to claim 7, wherein the parameters are measured with the electric machine acting as a load for the combustion engine.

9. Method according to claim 7, wherein the parameters are measured with the combustion engine acting as a load for the electric machine.

10. Method according to claim 1, wherein the vehicle system is one of diesel engine, electric machine, exhaust after treatment system, cooling system or battery.

11. Method according to claim 1, wherein the end of line test is performed at the end of the production line, when the vehicle is ready for delivery.

12. Method according to claim 1, wherein the ageing offset is dependent on outer conditions of the vehicle, where an outer condition is one of temperature, altitude, humidity, geographical position or the number of particles in the air.

13. Method according to claim 1, wherein at least two fingerprint files are combined into a fingerprint matrix.

14. Method according to claim 1, comprising measuring the plurality of parameter values via sensors that are at least one of installed on the vehicle and external to the vehicle.

15. Method according to claim 1, wherein the memory is at least one of part of a vehicle control system on the vehicle part of a central data base external to the vehicle.

16. Method according to claim 1, wherein the control system is part of the vehicle control system.

17. Method according to claim 1, wherein the plurality of parameter values includes at least one of friction torque of a combustion engine of the vehicle, engine efficiency of the combustion engine, injection timing of the combustion engine, temperature of the combustion engine, temperature variations in the combustion engine, temperature of an electric machine of the vehicle, temperature variations in the electric, machine, temperature of a battery of the vehicle, temperature variations in the battery, temperature of an exhaust gas after treatment system of the vehicle, temperature change of the exhaust gas after treatment system, exhaust gas composition in the exhaust gas after treatment system, rotational speed of a turbine of the vehicle, pressure of the turbine, temperature of the turbine, and vibrations in a chassis of the vehicle.

18. A computer comprising a computer program for performing when the program is run on the computer, a method for monitoring state of health of a vehicle system of a vehicle, comprising the following steps:
performing an end of line test on the vehicle system,
measuring a plurality of parameter values for the vehicle system at different running conditions during the end of line test,
storing the parameter values in a fingerprint file in a memory,
measuring the same plurality of parameter values that is comprised in the fingerprint file at similar running conditions after a predefined time interval and storing the plurality of parameter values measured after the predefined time interval in an additional fingerprint file in the memory,
adding a predefined ageing offset to the fingerprint file, where the ageing offset corresponds to a predicted wear of the system during the predefined time interval, thereby obtaining a time modified fingerprint file for the system, and storing the time modified fingerprint file in the memory,
comparing the additional fingerprint file with the time modified fingerprint file using a control system, and
issuing a message if the additional fingerprint file deviate from the time modified fingerprint file.

19. A computer program product comprising a computer program stored on a non-transitory computer readable medium for performing, when the program product is run on a computer, a method for monitoring state of health of a vehicle system of a vehicle, the method comprising:
performing an end of line test on the vehicle system,
measuring a plurality of parameter values for the vehicle system at different running conditions during the end of line test,
storing the parameter values in a fingerprint file in a memory,
measuring the same plurality of parameter values that is comprised in the fingerprint file at similar running conditions after a predefined time interval and storing the plurality of parameter values measured after the predefined time interval in an additional fingerprint file in the memory,
adding a predefined ageing offset to the fingerprint file, where the ageing offset corresponds to a predicted wear of the system during the predefined time interval, thereby obtaining a time modified fingerprint file for the system, and storing the time modified fingerprint file in the memory,
comparing the additional fingerprint file with the time modified fingerprint file using a control system, and
issuing a message if the additional fingerprint file deviate from the time modified fingerprint file.

* * * * *